April 17, 1951  C. E. McKINSEY  2,549,322
WIRE PACKAGING APPARATUS
Filed Aug. 10, 1945
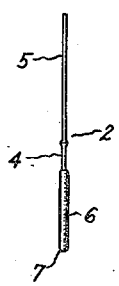
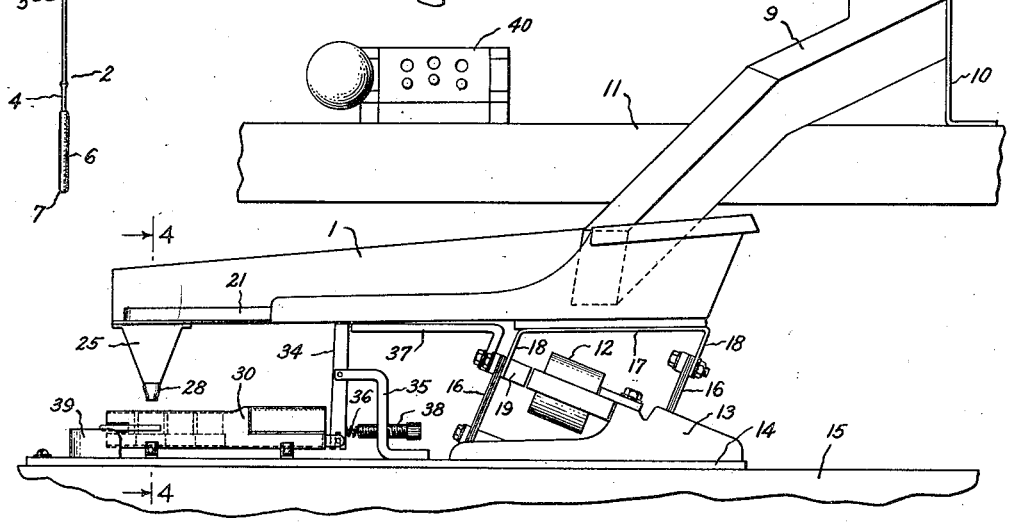
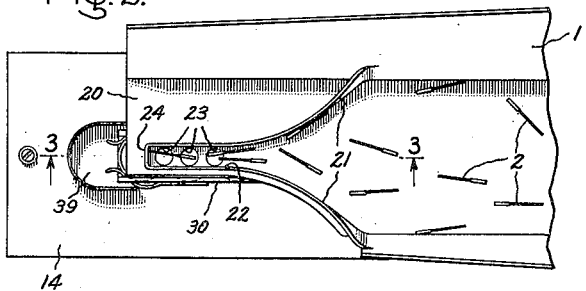
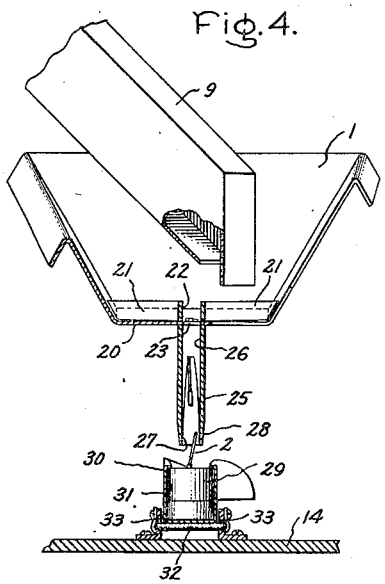
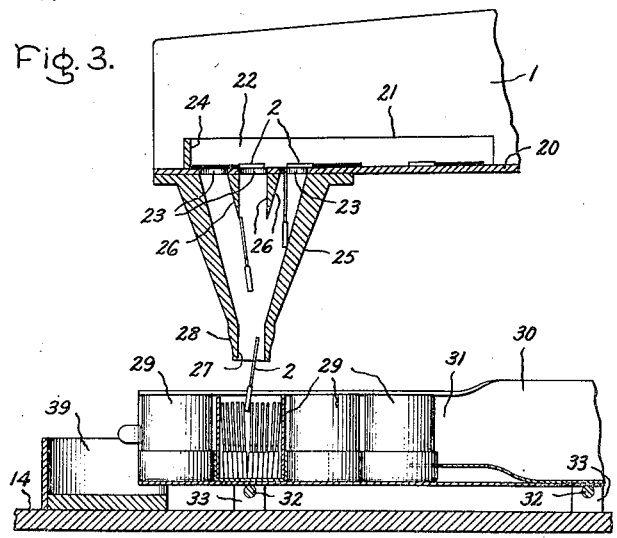
Inventor:
Clarence E. McKinsey.
by John H Anderson
His Attorney.

Patented Apr. 17, 1951

2,549,322

UNITED STATES PATENT OFFICE 2,549,322

WIRE PACKAGING APPARATUS

Clarence E. McKinsey, Painesville, Ohio, assignor to General Electric Company, a corporation of New York Application August 10, 1945, Serial No. 610,153

5 Claims. (Cl. 226—2)

My invention relates, in general, to article packaging apparatus and more particularly to apparatus for loading into boxes or cartridges lead-in wires such as are used in electric incandescent lamps, electronic tubes, and similar devices.

The hand loading of such lead-in wires endwise into cartridges for shipment purposes is a slow and tedious operation, requiring the services of a considerable number of operators if any sizable production is to be obtained. It is an object, therefore, of the present invention to provide apparatus for automatically loading such lead-in wires endwise into boxes or cartridges.

Further objects and advantages of my invention will appear from the following description of a species thereof and from the accompanying drawing in which:

Fig. 1 is a front elevation of the apparatus comprising my invention; Fig. 2 is a fragmentary plan view of the said apparatus; Fig. 3 is a longitudinal vertical section on the line 3—3 of Fig. 2; Fig. 4 is a transverse vertical section on the line 4—4 of Fig. 1; and Fig. 5 is an elevation, on an enlarged scale, of a typical form of lead-in wire which the apparatus according to the invention is adapted to load into cartridges.

Referring to the drawings, the apparatus according to the invention comprises a slightly inclined vibrating pan or tray 1 which is adapted to receive lead-in wires 2 as they are formed by a wire welding machine, for example, such as that described and illustrated in U. S. Patent 2,034,560, W. D. Bumstead, dated March 17, 1936. In the particular case illustrated, the lead-in wires 2 are of the three-part type comprising a central or seal portion 4 butt-welded to inner and outer lead portions 5 and 6 respectively, the outer lead 6 having a rounded end 7 and being of shorter length than the inner lead 5 but of substantially greater weight than the inner lead 5 and seal lead 4 combined so that the said outer lead portion provides a weighted end to the composite lead-in wire. The sections 4, 5 and 6 are electrically welded together while held in proper wire-welding relation in vertically disposed wire-holding drums 8 of the welding machine. Upon completion, the lead-in wires 2 are carried by the subsequent rotational index of the spaced drums 8 to a discharge position where the wires drop out of the transverse retaining grooves in the periphery of the drums and fall into a chute 9 which delivers them into the elevated end of the slightly inclined tray 1. The chute 9 is supported on a bracket 10 fastened to the table portion 11 of the welding machine.

Upon their delivery into the tray 1, the lead-in wires 2 gradually travel or slide forwardly down the vibrating inclined tray to the lowermost or discharge end thereof. During their travel down the tray 1, the lead-in wires 2 can be conveniently inspected for defects therein, and unsatisfactory wires removed from the tray.

The vibration of the tray 1 is imparted thereto by a commercial type electromagnet 12 supported on a base 13 mounted on a plate 14 on the bed 15 of the welding machine. To permit vibration thereof, the tray 1 is provided with a spring mounting comprising a spaced pair of cantilever leaf springs 16 inclined at a slight angle to the vertical and fastened at their lower ends to the electromagnet base 13. The tray 1 is fastened to the upper or free ends of the leaf springs 16 by means of a bracket 17 having downturned ends or arms 18 bolted to the leaf springs. The armature 19 of the electromagnet is fastened to one of the bracket arms 18. As shown in the drawing, the electromagnet 12 is set at an angle to the horizontal, for instance 20 to 30 degrees or thereabouts, so as to extend more or less at right angles to the leaf springs 16 and thus cause, when energized, vibrating movement of the tray 1 first forward and upwardly and then backward and downwardly.

At its front end, the tray bottom 20 is provided with upstanding guide plates 21 which converge to form a narrow passageway or channel 22. As they approach the forward end of the tray, the lead-in wires 2 are guided into the said channel 22 by the guide plates 21. During the course of their movement through the channel 22, the lead-in wires 2 drop by gravity, weighted end 6 foremost, into one or the other of a series (three in the particular case illustrated) of preferably circular apertures 23 formed in the tray bottom 20 at spaced intervals along the length of the channel. The diameter of the apertures 23 is just a little greater than the length of the outer lead sections 6 of the lead-in wires 2 as a result of which the wires 2 can only drop into the apertures 23 with their heavier end sections 6 foremost. In case any lead-in wire 2 should fail to drop into one or the other of the apertures 23 during the course of its travel through the channel 22, a stop or end wall 24 is provided across the said channel, at a point just beyond the last aperture 23, against which the said lead-in wire bumps and is continuously jarred backwardly up the channel (by reason of the vibrating action of the tray and the said end wall) until it eventually drops into one or the other of the apertures 23. In this connection, the location of the end wall 24 with respect to the last and second-last apertures 23 is such that any lead-in wire 2 striking against the end wall heavy end foremost will be jarred into such a position relative to the last aperture as to cause it to drop thereinto, and any lead-in wire 2 striking against the end wall heavy end rearmost will be jarred into such a position relative to the second last aperture as to cause it to drop into that aperture.

Fastened to the underside of the tray bottom 20 beneath the apertures 23 is a feed chute 25 comprising a block having more or less vertically extending passageways 26 the upper ends of which are aligned with the apertures 23 in the tray bottom 20 and the lower ends of which communicate with a common discharge passageway 27 in the lower or nozzle end 28 of the block. The chute passages 26 collect the lead-in wires 2 as they drop into the tray apertures 23 and convey them into the single outlet or feed passage 27 at the lower or nozzle end 28 of the feed block 25. The discharge nozzle 28 feeds or guides the said wires 2 endwise, heavy end 6 foremost, into the packing cartridge or container 29 which for that purpose is positioned immediately beneath the said nozzle, open end up. When the cartridge 29 becomes filled, it is removed from beneath the nozzle 28 and an empty cartridge positioned thereunder.

As the cartridge 29 begins to fill up with lead-in wires 2, it becomes necessary to shake the cartridge in order to insure complete insertion of the wires 2 thereinto. For this purpose, a vibrating cartridge holder 30 is provided beneath the discharge nozzle 28 for holding and vigorously shaking the cartridge while it is being filled with lead-in wires 2 from the said nozzle. The holder 30 is in the form of a channel-shaped member for holding a series of cartridges which are progressively moved through the channel 31 of the holder by an operator. The holder 30 rests on a pair of spaced rollers 32 journaled in upstanding lugs 33 fastened to the base plate 14 whereby the holder may be reciprocated back and forth.

The vibrating movement of the holder 30 is imparted thereto by a lever 34 pivotally mounted intermediate its ends on a bracket 35 fastened to the base plate 14. One end of the lever 34 is pivotally connected to an end of the holder 30 while its other end is continuously urged, by a compression coil spring 36, against an end of a push rod 37 fastened to the armature 19 of the electromagnet 12. The coil spring 36 is compressed between the lever 34 and the support bracket 35 for the said lever, an adjustment screw 38 being provided on said bracket, against which the spring seats, for varying the degree of compression of the spring. The vibrating movement of the electromagnet armature 19 is thus transmitted to the cartridge holder 30 through the push rod 37 and lever 34. The resulting vigorous vibration of the cartridge 29 being filled therefore serves to whirl the lead-in wires 2 around the cartridge and shake them completely down thereinto so as to be properly positioned therein. In this connection, the downwardly facing rounded ends 7 of the lead-in wires 2 also facilitate the movement of the lead-in wires 2 completely down into the cartridges.

When the cartridge 29 beneath the discharge or loading nozzle 28 becomes filled with the required number of lead-in wires 2, the operator advances the aligned group of cartridges in the holder channel 31 so as to position an empty cartridge beneath the nozzle 28. The filled cartridges 29 are thus advanced through the channel 31 until they are eventually pushed out the open front end of the holder 30 and drop into a receptacle 39 on the base plate 14 from which they are then removed and packed in shipping cartons by the operator. To give the operator an approximate indication of when a given number of lead-in wires 2 have been loaded into a cartridge 29, suitable counter means 40 may be provided, operated by a suitable moving part of the welding machine (such as by the knife that severs the seal wire portion 4 for each lead-in wire from the supply of such seal wire), for recording the number of lead-in wires 2 made by the welding machine and periodically giving an audible signal when the given number of lead-in wires 2 have been produced.

What I claim as new and desire to secure by Letters Patent of the United States is:

1. Apparatus for automatically loading endwise into cartridges wires having a weighted end, comprising a tray inclined at a small angle for receiving the wires, means for vibrating the said tray to cause the wires to travel therealong toward the lowermost end thereof, said tray having an aperture in its bottom wall adjacent the lower end thereof into which the wires may drop only weighted end foremost as they traverse the said aperture, means for guiding the wires on said tray across the said aperture, a feed chute at the underside of said tray for guiding the wires as they drop through the said aperture endwise into a cartridge positioned under the discharge end of said chute, holder means for holding the cartridge in position under the discharge end of said chute, means supporting the said holder for horizontal vibrating movement, and means for rapidly vibrating the cartridge holder and the cartridge carried thereby to whirl the wires around the cartridge and shake them completely down thereinto.

2. Apparatus for automatically loading endwise into cartridges wires having a weighted end, comprising a tray inclined at a small angle for receiving the wires, means for vibrating the said tray to cause the wires to travel therealong toward the lowermost end thereof, said tray having a series of apertures in its bottom wall adjacent the lower end thereof and aligned along the tray into which the wires may drop only weighted end foremost as they traverse the said apertures, means comprising upstanding convergent guide walls on the upper side of said tray for guiding the wires on said tray successively across the said aligned apertures, a feed chute at the underside of said tray for collecting the wires as they drop through the said apertures and guiding them endwise into a cartridge positioned under the discharge end of said chute, holder means for holding the cartridge in position under the discharge end of said chute, means supporting the said holder for horizontal vibrating movement, and means for rapidly vibrating the cartridge holder and the cartridge carried thereby to whirl the wires around the cartridge and shake them completely down thereinto.

3. Apparatus for automatically loading endwise into cartridges wires having a weighted end, comprising a tray inclined at a small angle for receiving the wires, electromagnetic means for rapidly vibrating the said tray to cause the wires to travel therealong toward the lowermost end thereof, said tray having a series of apertures in its bottom wall adjacent the lower end thereof and aligned along the tray into which the wires may drop only weighted end foremost as they traverse the said apertures, means comprising upstanding converging guide walls on the upper side of said tray for guiding the wires on said tray successively across the said aligned apertures, a feed chute at the underside of said tray for collecting the wires as they drop through the said apertures and guiding them endwise into a cartridge positioned under the discharge end of said chute, holder means for holding the cartridge in position under the the discharge end of said chute, means supporting the said holder for horizontal vibrating movement in a direction along the said tray, and means actuated by the tray vibrating means for rapidly vibrating the cartridge holder and the cartridge carried thereby to whirl the wires around the cartridge and shake them completely down thereinto.

4. Apparatus for automatically loading endwise into cartridges wires having a weighted end, comprising a wire-receiving tray inclined at a small angle and vibratable to cause the wires to travel therealong toward the lowermost end thereof, said tray having a group of apertures in its bottom wall adjacent the lower end thereof into which the wires may drop only weighted end foremost as they traverse the said apertures, means for guiding the wires on said tray across the said apertures, a feed chute at the underside of said tray for collecting the wires as they drop through the said apertures and guiding them endwise weighted end foremost into a cartridge positioned under the discharge end of said chute, a holder for supporting the cartridge in position under the discharge end of said chute, means comprising support pins on which the cartridge holder is supported for free horizontal vibratory movement thereon, and means for rapidly vibrating said tray and holder to move the wires down the tray and to whirl the wires around the cartridge and shake them completely down thereinto.

5. Apparatus for automatically loading endwise into cartridges wires having a weighted end, comprising a tray inclined at a small angle for receiving the wires, electromagnetic vibrator means operatively associated with said tray for vibrating it to cause the wires to travel therealong toward the lowermost end thereof, said tray having a group of apertures in its bottom wall adjacent the lower end thereof into which the wires may drop only weighted end foremost as they traverse the said apertures, means for guiding the wires on said tray across the said apertures, a feed chute at the underside of said tray for collecting the wires as they drop through the said apertures and guiding them endwise into a cartridge positioned under the discharge end of said chute, a holder for supporting the cartridge in position under the discharge end of said chute, means comprising support rollers on which the cartridge holder rests for free horizontal vibratory movement thereon, and a lever connecting said holder with the vibrating element of said vibrator means for vibrating the cartridge holder to whirl the wires around the cartridge and shake them completely down thereinto.

CLARENCE E. McKINSEY.

REFERENCES CITED

The following references are of record in the file of this patent:

UNITED STATES PATENTS

| Number | Name | Date |
|---|---|---|
| 1,485,099 | Wahl | Feb. 26, 1924 |
| 2,373,623 | Yost | Apr. 10, 1945 |